US008824366B2

(12) United States Patent
Lee et al.

(10) Patent No.: US 8,824,366 B2
(45) Date of Patent: Sep. 2, 2014

(54) METHOD AND APPARATUS OF RECEIVING DATA IN WIRELESS COMMUNICATION SYSTEM

(75) Inventors: Moon Il Lee, Anyang-si (KR); So Yeon Kim, Anyang-si (KR); Jae Hoon Chung, Anyang-si (KR); Hyun Soo Ko, Anyang-si (KR); Seung Hee Han, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 13/055,698

(22) PCT Filed: Jul. 24, 2009

(86) PCT No.: PCT/KR2009/004134
§ 371 (c)(1),
(2), (4) Date: Jan. 24, 2011

(87) PCT Pub. No.: WO2010/011104
PCT Pub. Date: Jan. 28, 2010

(65) Prior Publication Data
US 2011/0122825 A1  May 26, 2011

Related U.S. Application Data

(60) Provisional application No. 61/083,520, filed on Jul. 25, 2008, provisional application No. 61/084,629, filed on Jul. 30, 2008.

(30) Foreign Application Priority Data

Feb. 3, 2009  (KR) .................. 10-2009-0008567

(51) Int. Cl.
*H04W 4/00* (2009.01)
*H04W 28/06* (2009.01)
*H04W 48/12* (2009.01)
*H04J 11/00* (2006.01)
*H04B 7/005* (2006.01)
*G08C 17/00* (2006.01)
*H04H 20/71* (2008.01)
*H04J 3/00* (2006.01)
*H04B 7/208* (2006.01)
*H04B 7/212* (2006.01)
*H04W 24/00* (2009.01)
*H04W 72/00* (2009.01)

(52) U.S. Cl.
CPC .............. *H04W 48/12* (2013.01); *H04W 28/06* (2013.01); *H04J 11/0069* (2013.01); *Y02B 60/50* (2013.01)
USPC ........... 370/328; 370/206; 370/278; 370/311; 370/312; 370/329; 370/336; 370/344; 370/347; 370/442; 455/450; 455/456

(58) Field of Classification Search
CPC ..................................... H04W 48/12
USPC ......... 370/229, 251, 252, 278, 280–282, 294, 370/295, 320, 321, 326, 328, 330, 331, 370/335–339, 342, 344, 345, 347, 374, 376, 370/378, 389–394, 436, 458, 465–474, 478
See application file for complete search history.

(56) References Cited

U.S. PATENT DOCUMENTS

| 8,189,502 | B2 * | 5/2012 | Kwak et al. | 370/311 |
|---|---|---|---|---|
| 8,228,783 | B2 * | 7/2012 | Papasakellariou | 370/206 |
| 8,259,644 | B2 * | 9/2012 | Choi et al. | 370/321 |
| 2008/0253318 | A1 * | 10/2008 | Malladi et al. | 370/328 |
| 2009/0046617 | A1 * | 2/2009 | Tenny et al. | 370/312 |
| 2009/0092103 | A1 * | 4/2009 | Rao | 370/336 |

FOREIGN PATENT DOCUMENTS

| CN | 1600003 | 3/2005 |
|---|---|---|
| EP | 1420551 | 5/2004 |
| EP | 1501328 | 1/2005 |
| EP | 1304989 | 10/2005 |
| KR | 10-2002-0094076 A | 12/2002 |
| KR | 10-2008-0073645 A | 8/2008 |
| KR | 10-2008-0097112 A | 11/2008 |
| WO | 2008/023928 | 2/2008 |
| WO | 2008/084985 | 7/2008 |

OTHER PUBLICATIONS

Ericsson, "Blind PDCCH decoding," R1-082229, 3GPP TSG-RAN Meeting #53, May 2008, XP-050110524.
R. Love, et al., "Downlink Control Channel Design for 3GPP LTE," In: Proceeding of 2008 Wireless Communications and Networking Conference, Apr. 2008, pp. 813-818.
The State Intellectual Property Office of the People's Republic of China Application Serial No. 200980129175.X, Office Action dated May 6, 2013, 5 pages.
The State Intellectual Property Office of the People's Republic of China Application Serial No. 200980129175.X, Office Action dated Jan. 28, 2014, 6 pages.

* cited by examiner

*Primary Examiner* — Un C Cho
*Assistant Examiner* — Peian Lou
(74) *Attorney, Agent, or Firm* — Lee, Hong, Degerman, Kang & Waimey

(57) ABSTRACT

A method and an apparatus of receiving data in a wireless communication system are provided. The method includes detecting a physical downlink control channel (PDCCH) on which control information is transmitted in a first subframe, and receiving data in at least one second subframe based on the control information.

5 Claims, 8 Drawing Sheets

METHOD AND APPARATUS OF RECEIVING DATA IN WIRELESS COMMUNICATION SYSTEM

CROSS-REFERENCE TO RELATED APPLICATIONS

This application is the National Stage Filing under 35 U.S.C. 371 of International Application No. PCT/KR2009/004134, filed on Jul. 24, 2009, which claims the benefit of earlier filing date and right of priority to Korean Application No. 10-2009-0008567, filed on Feb. 3, 2009, and also claims the benefit of U.S. Provisional Application Ser. Nos. 61/084,629, filed on Jul. 30, 2008, and 61/083,520, filed on Jul. 25, 2008, the contents of which are all incorporated by reference herein in their entirety.

TECHNICAL FIELD

The present invention relates to wireless communications, and more particularly, to a method and an apparatus of receiving data in a wireless communication system.

BACKGROUND ART

In wireless communication systems, one base station (BS) generally provides services to a plurality of user equipments (UEs). The BS schedules user data for the plurality of UEs, and transmits the user data together with control information containing scheduling information for the user data. In general, a channel for carrying the control information is referred to as a control channel, and a channel for carrying the user data is referred to as a data channel. The UE finds control information of the UE by searching for the control channel, and processes data of the UE by using the control information.

In order for the UE to receive user data assigned to the UE, control information for the user data on a control channel must be received. In a given bandwidth, a plurality of pieces of control information for a plurality of UEs are generally multiplexed within one transmission interval. That is, to provide a service to the plurality of UEs, the BS multiplexes the plurality of pieces of control information for the plurality of UEs and then transmits the control information through a plurality of control channels. The UE searches for control channel of the UE among the plurality of control channels.

Blind decoding is one of schemes for detecting specific control information from the plurality of pieces of multiplexed control information. The blind decoding attempts to recover a control channel by using several combinations of information in a state where a UE has no information required to recover the control channel. That is, in a state where the UE does not know whether control information transmitted from the BS is control information of the UE and the UE does not know in which portion the control information of the UE exists, the UE decodes all pieces of given control information until the control information of the UE is found. The UE can use information unique to each UE to detect the control information of the UE. For example, when the BS multiplexes control information of each UE, an identifier unique to each UE can be transmitted by being masked onto a cyclic redundancy check (CRC). The CRC is a code used for error detection. The UE de-masks unique identifier of the UE from the CRC of the received control information, and then can detect the control information of the UE by performing CRC checking.

If the UE cannot correctly detect the control information of the UE from the pieces of multiplexed control information, user data on the data channel cannot be decoded. Therefore, fast and correct detection of the control information has a significant effect on overall system performance. However, it may be difficult to detect the control information when using only blind decoding. Since each UE may require different control information and may use a channel encoding scheme by the use of a different code rate, each UE may have control information with a different size. Therefore, the number of blind decoding attempts may be significantly increased in a control region in which control information is transmitted. Battery consumption of the UE increases in proportion to the number of detection attempts.

Meanwhile, as a mobile communication system of a next generation (i.e., post-3rd generation), an international mobile telecommunication-advanced (IMT-A) system is standardized aiming at support of an Internet protocol (IP)-based seamless multimedia service in an international telecommunication union (ITU) by providing a high-speed data rate of 1 gigabits per second (Gbps) in downlink communication and 500 megabits per second (Mbps) in uplink communication. In a 3rd generation partnership project (3GPP), a 3GPP long term evolution-advanced (LTE-A) system is considered as a candidate technique for the IMT-A system. The LTE-A system is evolved to increase a completion level of the LTE system, and is expected to maintain backward compatibility with the LTE system. This is because the provisioning of compatibility between the LTE-A system and the LTE system is advantageous in terms of user convenience, and is also advantageous for a service provider since existing equipment can be reused.

Accordingly, there is a need for a method in which a BS effectively transmits control information and a UE effectively receives data by using the control information in a next generation mobile communication system such as an LTE-A.

DISCLOSURE OF INVENTION

Technical Problem

The present invention provides a method and an apparatus of effectively receiving data in a wireless communication system.

Solution to Problem

In one aspect, a method of receiving data in a wireless communication system, carried in a user equipment (UE), is provided. The method includes detecting a physical downlink control channel (PDCCH) on which control information is transmitted in a first subframe, and receiving data in at least one second subframe based on the control information.

Preferably, The method of claim 1, wherein the at least one second subframe comprises the first subframe.

Preferably, the at least one second subframe comprises a plurality of contiguous subframes.

Preferably, the first subframe and the at least one second subframe are transmitted in different time.

Preferably, the control information comprises subframe information which indicates the at least one second subframe.

Preferably, the subframe information comprises the number of the at least one second subframe.

Preferably, the subframe information comprises an offset field.

Preferably, the offset field indicates an offset between the first subframe and one subframe out of the at least one second subframe.

Preferably, the offset field indicates an offset between two adjacent subframes out of the at least one second subframes.

Preferably, the offset field indicates either an offset in a time domain or an offset in a frequency domain.

Preferably, a control format indicator (CFI) transmitted on a physical control format indicator channel (PCFICH) in the at least one second subframes has a specific value.

In another aspect, a UE is provided. The UE includes a radio frequency (RF) unit transmitting and/or receiving a radio signal and a processor coupled with the RF unit and configured to detect a PDCCH on which control information is transmitted in a first subframe and receive data in at least one second subframe based on the control information.

In still another aspect, a method of transmitting data in a wireless communication system, carried in a UE, is provided. The method includes detecting a physical downlink control channel (PDCCH) on which control information is transmitted in a first subframe, and transmitting data in at least one second subframe based on the control information.

Advantageous Effects of Invention

A method and an apparatus of effectively receiving data in a wireless communication system are provided.

MODE FOR THE INVENTION

Figure 1:
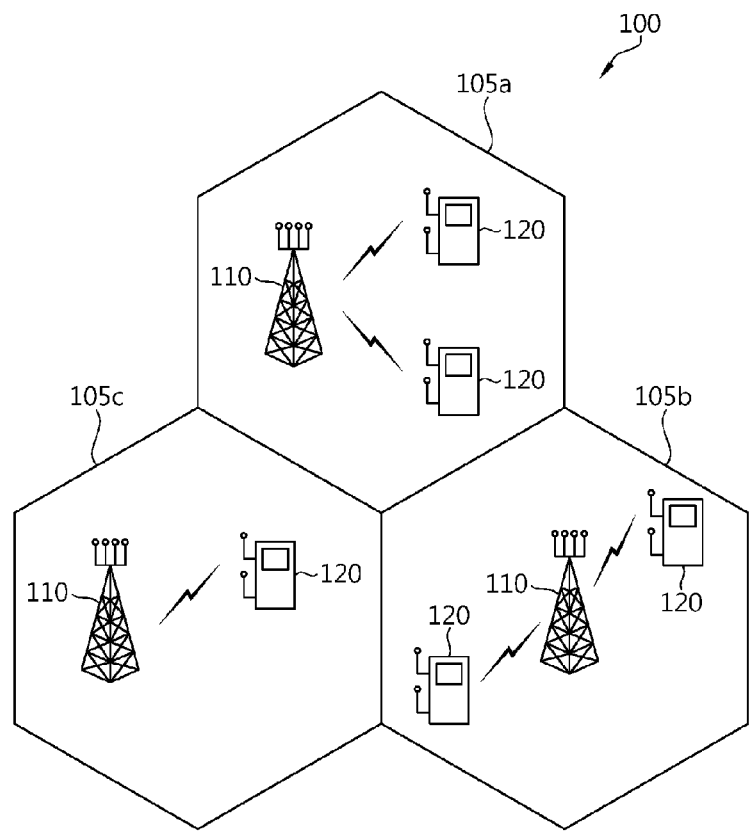
FIG. 1 is a block diagram showing a wireless communication system.

FIG. 1 is a block diagram showing a wireless communication system.

Referring to FIG. 1, a wireless communication system 100 includes at least one base station (BS) 110. The BSs 110 provide communication services with respect to specific geographical regions (generally referred to as cells) 105a, 105b, and 105c. Each cell can be divided into a plurality of regions (referred to as sectors). A user equipment (UE) 120 may be fixed or mobile, and may be referred to as another terminology, such as a mobile station (MS), a user terminal (UT), a subscriber station (SS), a wireless device, etc. The BS 110 is generally a fixed station that communicates with the UE 120 and may be referred to as another terminology, such as an evolved node-B (eNB), a base transceiver system (BTS), an access point, etc.

Hereinafter, downlink means communication from the BS 110 to the UE 120, and uplink means communication from the UE 120 to the BS 110. In downlink, a transmitter may be a part of the BS 110 and a receiver may be a part of the UE 120. In uplink, a transmitter may be a part of the UE 120 and a receiver may be a part of the BS 110.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit (Tx) antennas and a plurality of receive (Rx) antennas. The MISO system uses a plurality of Tx antennas and one Rx antenna. The SISO system uses one Tx antenna and one Rx antenna. The SIMO system uses one Tx antenna and a plurality of Rx antennas.

Hereinafter, the Tx antenna is a logical or physical antenna used to transmit one signal or one stream, and the Rx antenna is a logical or physical antenna used to receive one signal or one stream.

Figure 2:
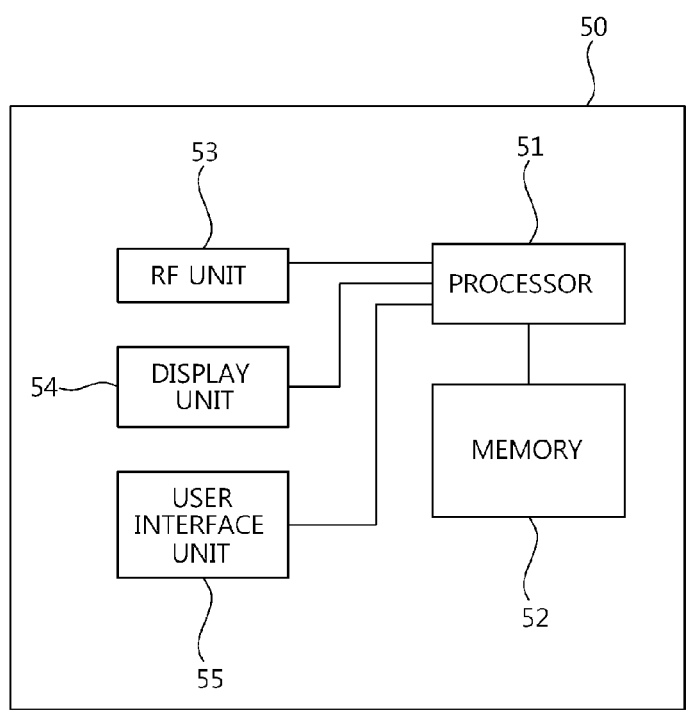
FIG. 2 is a block diagram showing an apparatus for a wireless communication.

FIG. 2 is a block diagram showing an apparatus for a wireless communication. The apparatus may be a part of a UE. An apparatus 50 includes a processor 51, a memory 52, a radio frequency (RF) unit 53, a display unit 54, and a user interface unit 55. The processor 51 may be configured to implement functions, procedures to be proposed below and/or methods described below in this description. Layers of the radio interface protocol may be implemented in the processor 51. The processor 51 may provide the control plane and the user plane. The function of each layer can be implemented in the processor 51. The memory 52 is operatively coupled with the processor 51 and stores a variety of information to operate the processor 51 (e.g., an operating system, applications, and general files). The display unit 54 displays a variety of information of the apparatus 50 and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is operatively coupled with the processor 51 and transmits and/or receives radio signals.

The processor 51 may include application-specific integrated circuit (ASIC), other chipset, logic circuit and/or data processing device. The memories 52 may include read-only memory (ROM), random access memory (RAM), flash memory, memory card, storage medium and/or other storage device. The RF units 53 may include baseband circuitry to process radio frequency signals. When the embodiments are implemented in software, the techniques described herein can be implemented with modules (e.g., procedures, functions, and so on) that perform the functions described herein. The modules can be stored in memories 52 and executed by processor 51. The memories 52 can be implemented within the processor 51 or external to the processor 51 in which case those can be communicatively coupled to the processor 51 via various means as is known in the art.

Layers of a radio interface protocol between the UE and the network can be classified into a first layer (L1), a second layer (L2), and a third layer (L3) based on the lower three layers of the open system interconnection (OSI) model that is well-known in the communication system. The first layer is a physical (PHY) layer. The second layer can be divided into a medium access control (MAC) layer, a radio link control (RLC) layer, and a packet data convergence protocol (PDCP) layer. The third layer is a radio resource control (RRC) layer.

Figure 3:
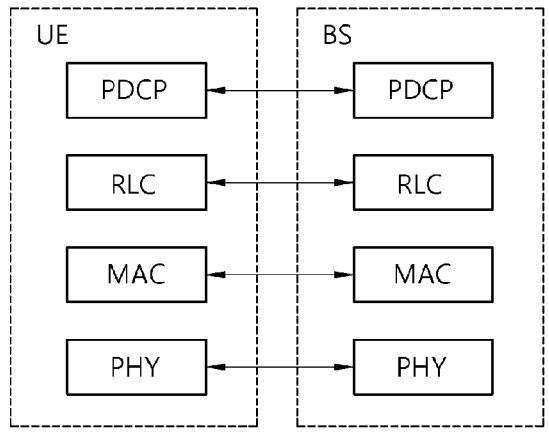
FIG. 3 is a diagram showing a radio protocol architecture for a user plane.
Figure 4:
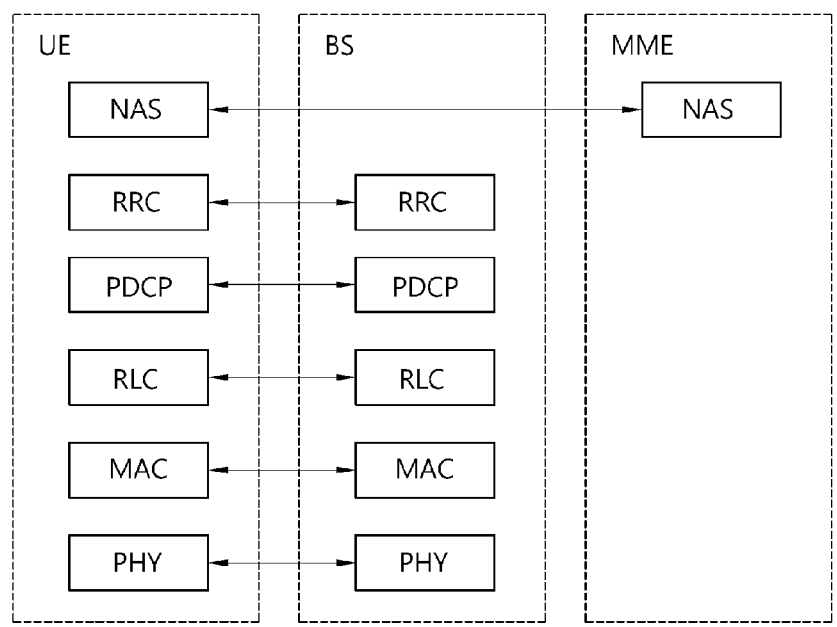
FIG. 4 is a diagram showing a radio protocol architecture for a control plane.

FIG. 3 is a block diagram showing a radio protocol architecture for a user plane. FIG. 4 is a block diagram showing a radio protocol architecture for a control plane. They illustrate the architecture of a radio interface protocol between a UE and an evolved universal terrestrial radio access network (E-UTRAN). The user plane is a protocol stack for user data transmission. The control plane is a protocol stack for control signal transmission.

Referring to FIGS. 3 and 4, between different PHY layers (i.e., a PHY layer of a transmitter and a PHY layer of a receiver), information is carried through a physical channel. The PHY layer is coupled with a MAC layer, i.e., an upper layer of the PHY layer, through a transport channel. Data is transferred between the MAC layer and the PHY layer through the transport channel. The PHY layer provides the MAC layer and upper layers with information transfer services through the transport channel.

The MAC layer provides services to an RLC layer, i.e., an upper layer of the MAC layer, through a logical channel. The RLC layer supports reliable data transmission. The PDCP layer performs a header compression function to reduce a header size of an Internet protocol (IP) packet.

An RRC layer is defined only in the control plane. The RRC layer controls radio resources between the UE and the network. For this, in the RRC layer, RRC messages are exchanged between the UE and the network. The RRC layer serves to control the logical channel, the transport channel, and the physical channel in association with configuration, reconfiguration and release of radio bearers (RBs). An RB means a logical path provided by a first layer (i.e. PHY layer) and second layers (i.e. MAC layer, RLC layer and PDCP layer) for data transmission between the UE and the network. Configuring the RB includes defining radio protocol layers and characteristics of channels to provide a service and defining specific parameters and operation schemes. The RB may be classified into a signaling RB (SRB) and a data RB (DRB). The SRB is used as the path to transfer RRC messages in the control plane and the DRB is used as the path to transfer user data in the user plane. When an RRC connection is established between an RRC layer of the UE and an RRC layer of the network, it is called that the UE is in an RRC connected mode. When the RRC connection is not established yet, it is called that the UE is in an RRC idle mode.

A non-access stratum (NAS) layer belongs to an upper layer of the RRC layer and serves to perform session management, mobility management, or the like.

Figure 5:
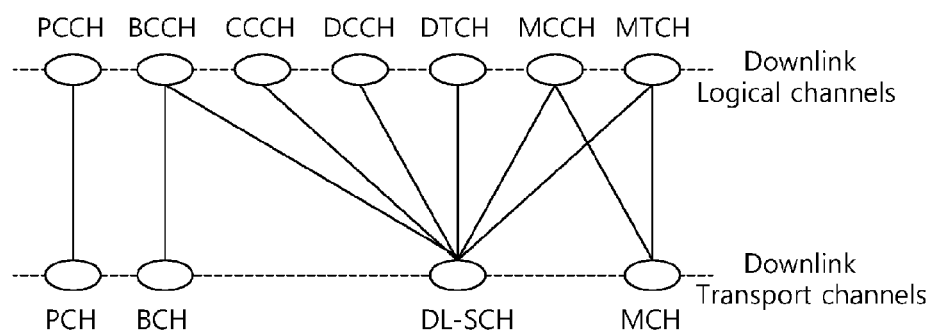
FIG. 5 shows mapping between a downlink logical channel and a downlink transport channel.

FIG. 5 shows mapping between a downlink logical channel and a downlink transport channel. The section 6.1.3.2 of 3GPP TS 36.300 V8.3.0 (2007-12) Technical Specification Group Radio Access Network; Evolved Universal Terrestrial Radio Access (E-UTRA) and Evolved Universal Terrestrial Radio Access Network (E-UTRAN); Overall description; Stage 2 (Release 8) may be incorporated herein by reference.

Referring to FIG. 5, a paging control channel (PCCH) is mapped to a paging channel (PCH). A broadcast control channel (BCCH) is mapped to a broadcast channel (BCH) or a downlink shared channel (DL-SCH). A common control channel (CCCH), a dedicated control channel (DCCH), a dedicated traffic channel (DTCH), a multicast control channel (MCCH), and a multicast traffic channel (MTCH) are mapped to the DL-SCH. The MCCH and MTCH are also mapped to a multicast channel (MCH).

A type of each logical channel is defined according to a type of information to be transmitted. The logical channel is classified into a control channel and a traffic channel.

The control channel is used to transmit control plane information. The BCCH is a downlink channel for broadcasting system control information. The PCCH is a downlink channel for transmitting paging information and is used when a network does not know a location of a UE. The CCCH is a channel for transmitting control information between the UE and the network and is used when there is no RRC connection established between the UE and the network. The MCCH is a point-to-multipoint downlink channel used for transmitting multimedia broadcast multicast service (MBMS) control information. The MCCH is used by UEs that receive an MBMS. The DCCH is a point-to-point bi-directional channel for transmitting dedicated control information between the UE and the network, and is used by UEs having an RRC connection.

The traffic channel is used to transmit user plane information. The DTCH is a point-to-point channel for transmitting user information and exists in both uplink and downlink. The MTCH is a point-to-multipoint downlink channel for transmitting traffic data and is used by UEs that receive an MBMS.

The transport channels are classified by how and with what characteristics data are transferred over the radio interface. The BCH is broadcast in the entire coverage area of the cell and has a fixed, pre-defined transport format. The DL-SCH is characterized by support for hybrid automatic repeat request (HARM), support for dynamic link adaptation by varying modulation, coding, and transmit (Tx) power, possibility to be broadcast in the entire cell, and possibility to use beamforming, support for both dynamic and semi-static resource assignment, support for UE discontinuous reception (DRX) to enable UE power saving, and support for MBMS transmission. The PCH is characterized by support for DRX to enable UE power saving and requirement to be broadcast in the entire coverage area of the cell. The MCH is characterized by support for requirement to be broadcast in the entire coverage area of the cell and support for an MBMS single frequency network (MBSFN).

Figure 6:
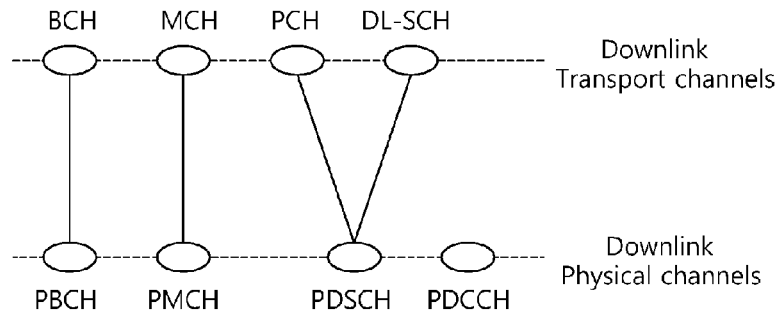
FIG. 6 shows mapping between a downlink transport channel and a downlink physical channel.

FIG. 6 shows mapping between a downlink transport channel and a downlink physical channel. The section 5.3.1 of 3GPP TS 36.300 V8.3.0 (2007-12) may be incorporated herein by reference.

Referring to FIG. 6, a BCH is mapped to a physical broadcast channel (PBCH). An MCH is mapped to a physical multicast channel (PMCH). A PCH and a DL-SCH are mapped to a physical downlink shared channel (PDSCH). The PBCH carries a BCH transport block. The PMCH carries the MCH. The PDSCH carries the DL-SCH and the PCH.

Several downlink physical control channels are used in a PHY layer. A physical downlink control channel (PDCCH) informs a UE of resource assignment of the PCH and DL-SCH, and also informs the UE of HARQ information related to the DL-SCH. The PDCCH may carry an uplink scheduling grant which informs the UE of resource assignment for uplink transmission. A physical control format indicator channel (PCFICH) informs the UE of the number of orthogonal frequency division multiplexing (OFDM) symbols used for transmission of the PDCCHs within a subframe. The PCFICH is transmitted in every subframe. A physical hybrid ARQ indicator channel (PHICH) carries HARQ acknowledgement (ACK)/negative-acknowledgement (NACK) in response to uplink transmission.

Figure 7:
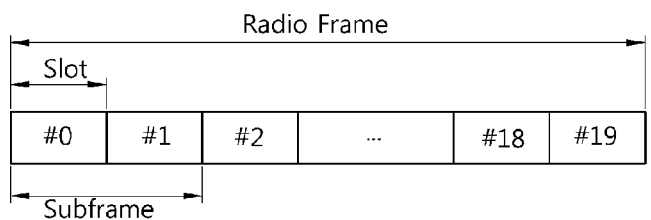
FIG. 7 shows a structure of a radio frame.

FIG. 7 shows a structure of a radio frame.

Referring to FIG. 7, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Figure 8:
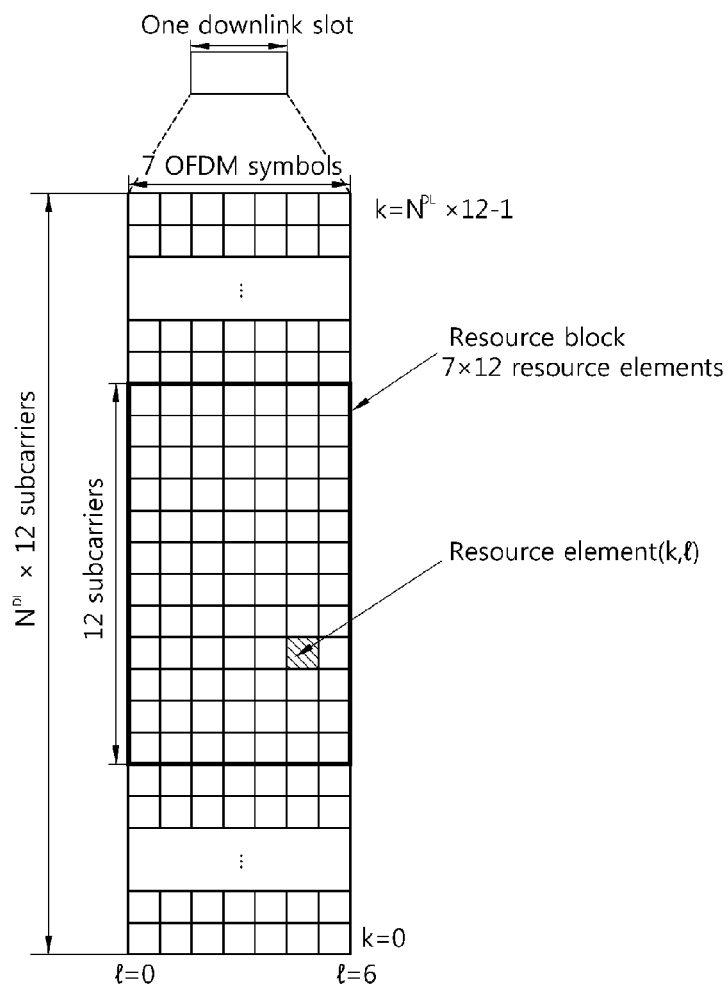
FIG. 8 shows an example of a resource grid for one downlink slot.

FIG. 8 shows an example of a resource grid for one downlink slot.

Referring to FIG. 8, the downlink slot includes a plurality of OFDM symbols in a time domain and NAL resource blocks (RBs) in a frequency domain. The OFDM symbol is for representing one symbol period. The OFDM symbol may also be referred to as an orthogonal frequency division multiple access (OFDMA) symbol, single carrier-frequency division multiple access (SC-FDMA) symbol, etc. in accordance with multiple access scheme. The number $N^{DL}$ of resource blocks included in the downlink slot depends on a downlink transmission bandwidth configured in a cell. One RB includes a plurality of subcarriers in the frequency domain.

Each element on the resource grid is referred to as a resource element. The resource element on the resource grid can be identified by an index pair (k, l) within the slot. Herein, $k(k=0, \ldots, N^{DL} \times 12-1)$ denotes a subcarrier index in the frequency domain, and $l(l=0, \ldots, 6)$ denotes an OFDM symbol index in the time domain.

Although it is described herein that one RB includes 7×12 resource elements consisting of 7 OFDM symbols in the time domain and 12 subcarriers in the frequency domain for example, the number of OFDM symbols and the number of subcarriers in the RB are not limited thereto. Thus, the number of OFDM symbols and the number of subcarriers may change variously depending on a cyclic prefix (CP) length, a frequency spacing, etc. For example, when using a normal CP, the number of OFDM symbols is 7, and when using an extended CP, the number of OFDM symbols is 6. The structure of an uplink slot may be same as that of the downlink slot.

Figure 9:
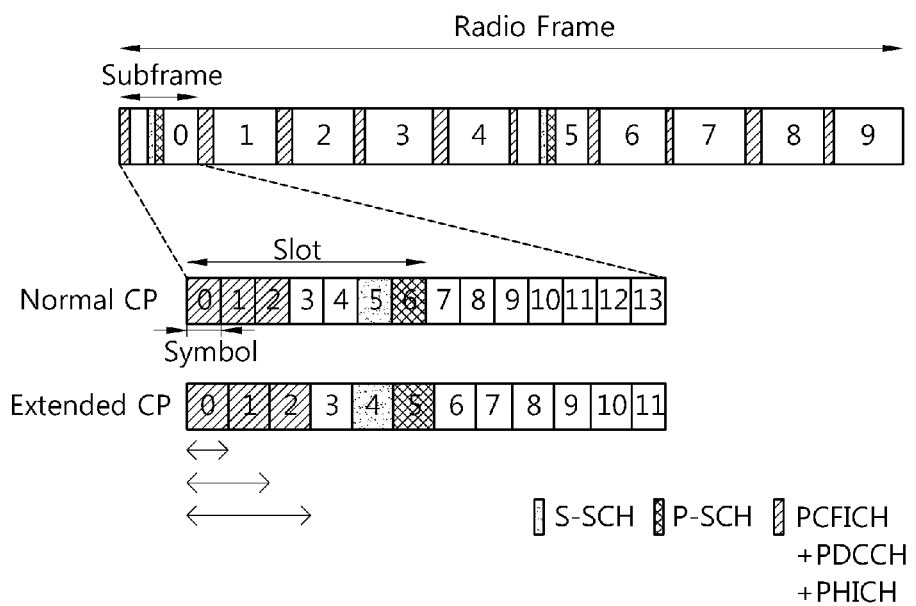
FIG. 9 shows a structure of a radio frame and a subframe.

FIG. 9 shows a structure of a radio frame and a subframe.

Referring to FIG. 9, the radio frame includes 10 subframes, and each subframe includes two consecutive slots. When using a normal CP, the subframe includes 14 OFDM symbols. When using an extended CP, the subframe includes 12 OFDM symbols. A synchronization channel (SCH) is transmitted in every radio frame. The SCH is a channel for cell search. The cell search is a process in which a UE attains time synchronization and frequency synchronization with respect to a cell and detect a cell ID (identifier) of the cell. The SCH includes a primary (P)-SCH and a secondary (S)-SCH. The P-SCH is transmitted through a last OFDM symbol of a 1st slot of a subframe 0 and a subframe 5 in a radio frame. When using the normal CP, the P-SCH is an OFDM symbol 6 in the subframe, and when using the extended CP, the P-SCH is an OFDM symbol 5 in the subframe. The S-SCH is transmitted through an OFDM symbol located immediately before an OFDM symbol on which the P-SCH is transmitted.

A maximum of three OFDM symbols (i.e., OFDM symbols 0, 1, and 2) located in a front portion of a 1st slot in every subframe correspond to a control region to be assigned with a PDCCH. The remaining OFDM symbols correspond to a data region to be assigned with a PDSCH. In addition to the PDCCH, control channels such as a PCFICH, a PHICH, etc., can be assigned to the control region. A UE can read data information transmitted through the PDSCH by decoding control information transmitted through the PDCCH. Although the control region includes three OFDM symbols herein, this is for exemplary purposes only. According to an amount of control information, the PDCCH is transmitted through the OFDM symbol 0, or the OFDM symbols 0 and 1, or the OFDM symbols 0 to 2. The number of OFDM symbols used for PDCCH transmission may change in every subframe. The number of OFDM symbols used for PDCCH transmission in the subframe can be known by using the PCFICH.

The PCFICH is transmitted through a 1st OFDM symbol (i.e., the OFDM symbol 0) in every subframe. The PCFICH can be transmitted through one antenna or can be transmitted using a transmit diversity scheme. When a subframe is received, the UE evaluates control information transmitted through the PCFICH, and then receives control information transmitted through the PDCCH.

The control information transmitted through the PCFICH is referred to as a control format indicator (CFI). For example, the CFI may have a value of 1, 2, or 3. The CFI value may represent the number of OFDM symbols used for PDCCH transmission in a subframe. That is, if the CIF value is 2, the number of OFDM symbols used for PDCCH transmission in a subframe is 2. This is for exemplary purposes only, and thus information indicated by the CFI may be defined differently according to a bandwidth. For example, if the bandwidth is less than a specific threshold value, the CFI values of 1, 2, and 3 may indicate that the number of OFDM symbols used for PDCCH transmission in the subframe is 2, 3, and 4, respectively.

The following table shows an example of a CFI and a 32-bit CFI codeword which generates by performing channel coding to the CFI.

TABLE 1

| CFI | CFI codeword $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The CFI codeword can be modulated using a quadrature phase shift keying (QPSK) scheme. In this case, the 32-bit codeword is modulated into 16 symbols. Accordingly, 16 subcarriers are used in PCFICH transmission.

A resource element group (REG) is used to define mapping of a control channel onto a resource element. One REG can consist of 4 resource elements except for a resource element used for reference signal transmission. A 1st OFDM symbol in a subframe has 2 REGs in one resource block.

Since 16 subcarriers are used in PCFICH transmission, 4 REGs can be used in PCFICH transmission. An REG to which the PCFICH is mapped may vary according to the number of resource blocks in a frequency domain. In order to avoid inter-cell interference of the PCFICH, the REG to which the PCFICH is mapped can be shifted in the frequency domain according to a cell ID.

Figure 10:
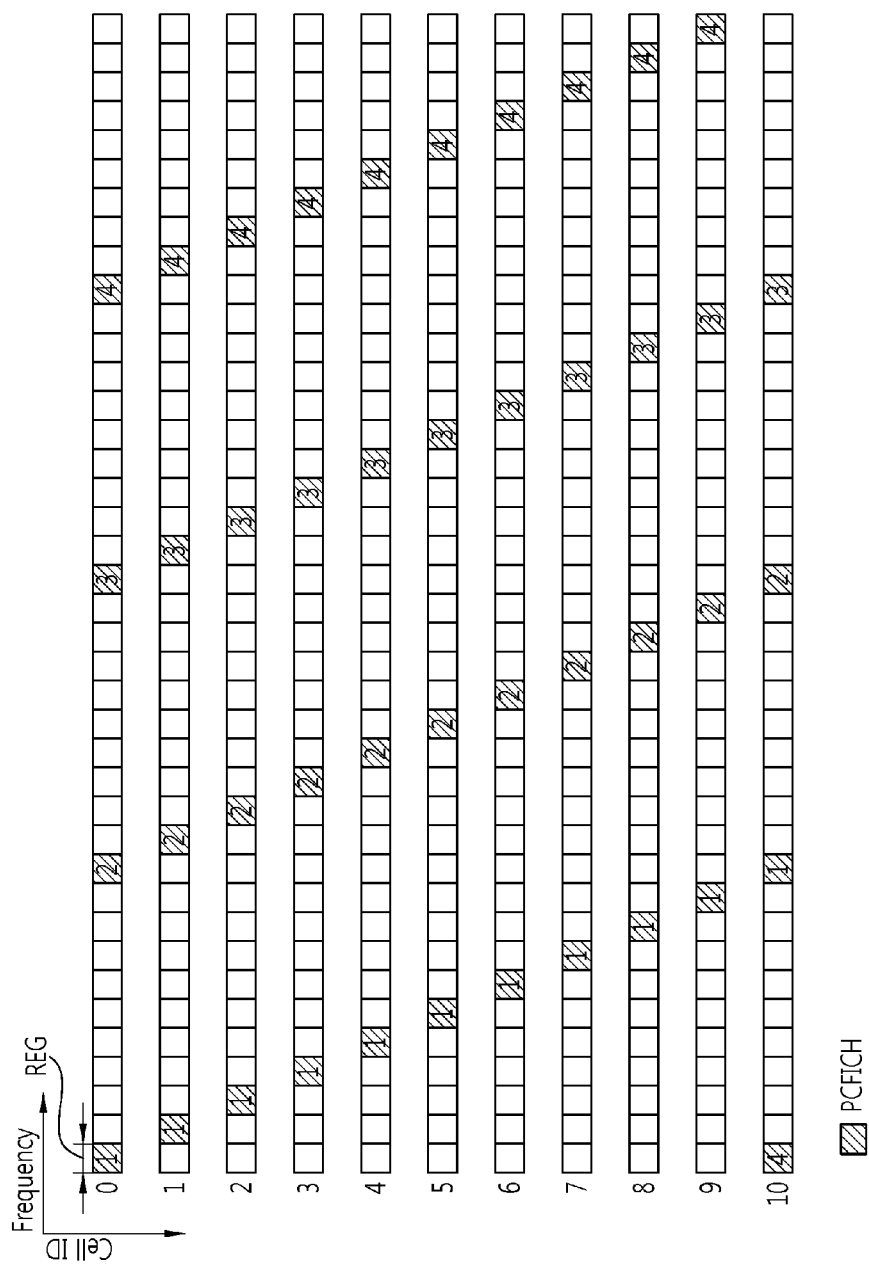
FIG. 10 shows an example of mapping a physical control format indicator channel (PCFICH) to resource element groups (REGs).

FIG. 10 shows an example of mapping a PCFICH to REGs.

Referring to FIG. 10, the PCFICH is transmitted on 4 REGs, and the respective REGs to which the PCFICH are mapped are spaced apart from one another. In addition, the REGs to which the PCFICH is mapped are shifted in a frequency domain according to a cell ID.

Now, a PHICH will be described.

A plurality of PHICHs constitute one PHICH group, and are mapped to the same REG. The PHICHs in the PHICH group can be separated through different sequences. For example, orthogonal sequences can be used. One PHICH group can include PHICH channels for a plurality of UEs. A plurality of PHICH groups can be created in one subframe. For example, ACK/NACK information transmitted through the PHICH may be repeated three times, and may be spread by 4-fold to create 12 symbols. In this case, 3 REGs can be used in PHICH transmission.

Figure 11:
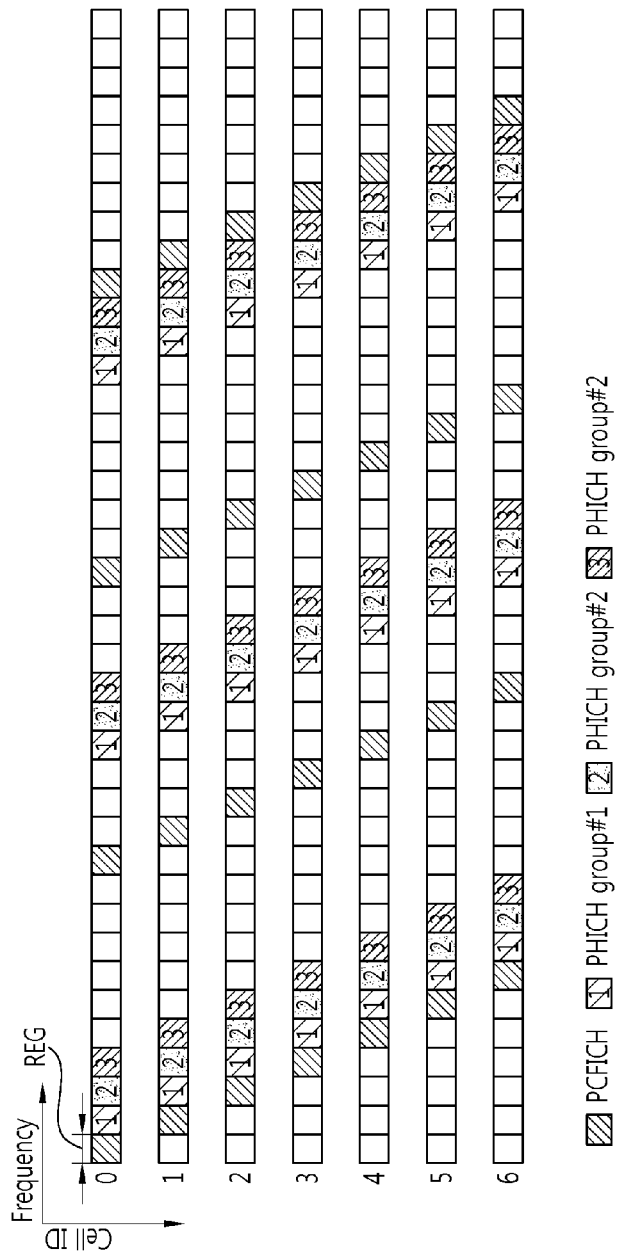
FIG. 11 shows an example of mapping a PCFICH and a physical hybrid ARQ indicator channel (PHICH) to REGs.

FIG. 11 shows an example of mapping a PCFICH and a PHICH to REGs.

Referring to FIG. 11, there are 3 PHICH groups, each of which is mapped to an REG to which a PCFICH is not mapped. Each PHICH group is transmitted on 3 REGs. The REGs to which each PHICH group is mapped are switched in a frequency domain according to a cell ID. Inter-cell interference of the PHICH can be avoided by shifting the REGs in the frequency domain.

Now, a PDCCH will be described.

A control region consists of a logical CCE stream which is a plurality of control channel elements (CCEs). Hereinafter, the CCE stream is a set of all CCEs constituting the control region in one subframe. The CCE corresponds to a plurality of REGs. For example, the CCE may correspond to 9 REGs.

A plurality of PDCCHs can be transmitted in the control region. The PDCCH carries control information such as scheduling grant, power control, etc. The PDCCH is transmitted on an aggregation of one or several consecutive CCEs. A format of the PDCCH and the possible number of bits of the PDCCH are determined according to the number of CCEs constituting the CCE aggregation. Hereinafter, the number of CCEs used for PDCCH transmission is referred to as a CCE aggregation level. The CCE aggregation level is a CCE unit for searching for the PDCCH. A size of the CCE aggregation level is defined by the number of contiguous CCEs. For example, the CCE aggregation level may be an element of $\{1, 2, 4, 8\}$.

The following table shows an example of the format of the PDCCH and the possible number of bits of the PDCCH.

TABLE 2

| PDCCH format | CCE aggregation level | Number of resource element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Control information transmitted through the PDCCH is referred to as downlink control information (DCI). The DCI transports uplink or downlink scheduling information, an uplink power control command, etc. A size and usage of the control information transmitted through the PDCCH may differ according to the DCI format.

The following table shows an example of the DCI format.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of closed-loop rank-adapted spatial multiplexing mode |
| 2A | Scheduling of open-loop rank-adapted spatial multiplexing mode |
| 3 | TPC commands for PUCCH and PUSCH with 2 bit power adjustments |
| 3A | TPC commands for PUCCH and PUSCH with single bit power adjustments |

A DCI format 0 is used for physical uplink shared channel (PUSCH) scheduling. A DCI format 1 is used for scheduling of one PDSCH codeword. A DCI format 1A is used for compact scheduling of one PDSCH codeword. A DCI format 1B is used for compact scheduling of one PDSCH codeword in a closed-loop rank 1 transmission mode. A DCI format 1C is used for paging, random access channel (RACH) response, and dynamic BCCH. A DCI format 1D is used for PDSCH scheduling in a multi-user (MU)-MIMO mode. A DCI format 2 is used for PDSCH scheduling in a closed-loop rank-adapted spatial multiplexing mode. A DCI format 2A is used for PDSCH scheduling in an open-loop rank-adapted spatial multiplexing mode. DCI formats 3 and 3A are used for transmission of a transmission power control (TPC) command for a physical uplink control channel (PUCCH) and a PUSCH.

Each DCI format consists of a plurality of information fields. The following table shows an example of information fields constituting the DCI format 1.

TABLE 4

| Information fields | # of bits | Information |
|---|---|---|
| Resource allocation header | 1 bit | Resource allocation type 0/type 1 |
| Resource block assignment | variable | # of bits can be different according to the bandwidth size |
| MCS | 5 bits | Modulation order and channel coding rate |
| HARQ process number | 3 bits | Maximum 8 HARQ process due to N-channel stop-and-wait |
| New data indicator(NDI) | 1 bit | If toggled, indicates new data transmission |
| Redundancy version (RV) | 2 bits | Starting point of the channel codes for HARQ |
| TPC command for PUCCH | 2 bits | For uplink power control |
| Downlink Assignment Index | 2 bits | TDD only |

Herein, a resource allocation header field indicates a resource allocation type. A resource block assignment field may have a different size according to a bandwidth size. A modulation and coding scheme (MCS) field indicates a modulation order and a channel coding rate. A hybrid automatic repeat request (HARQ) process number field can indicate up to 8 HARQ processes. A new data indicator (NDI) field indicates new data transmission if toggled. A redundancy version (RV) field indicates a starting point of channel codes for HARQ. A TPC command field indicates information for uplink power control. A downlink assignment index field is used only in a time division duplex (TDD) system. A size of each information field is shown for exemplary purposes only, and thus a bit size of each information field is not limited thereto.

Figure 12:
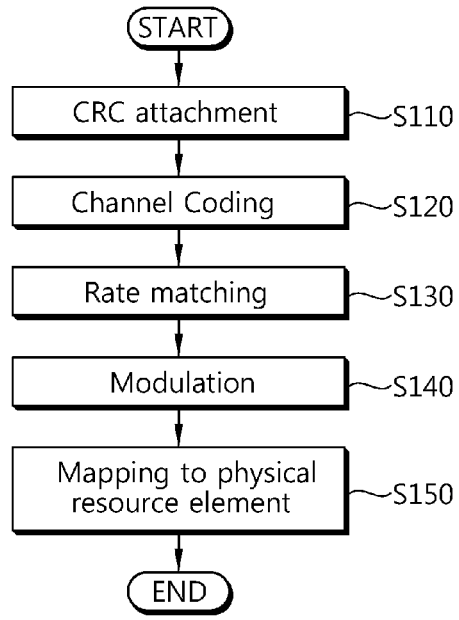
FIG. 12 is a flowchart showing a process of configuring a physical downlink control channel (PDCCH).

FIG. 12 is a flowchart showing a process of configuring a PDCCH.

Referring to FIG. 12, in step S110, a BS attaches a cyclic redundancy check (CRC) for error detection to DCI to be transmitted to a UE. The CRC is masked with an identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked onto the CRC. Alternatively, if the PDCCH is for a paging message transmitted through a PCH, a paging indicator identifier (e.g., paging-RNTI (P-RNTI)) may be masked onto the CRC. If the PDCCH is for system information transmitted through a DL-SCH, a system information identifier (e.g., system information-RNTI (SI-RNTI)) may be masked onto the CRC. If the PDCCH is for indicating a random access response that is a response for transmission of a random access preamble of the UE, a random access-RNTI (RA-RNTI) may be masked onto the CRC.

In step S120, the CRC-attached control information is channel-coded to generate coded data. In step S130, a rate matching is performed. In step S140, modulation symbols are generated by modulating the coded data. In step S150, the modulation symbols are mapped to physical resource elements.

A plurality of PDCCHs for several UEs can be transmitted by being multiplexed in one subframe. The aforementioned process of configuring the PDCCH of FIG. 12 is performed independently for each PDCCH. The BS does not provide the UE with information indicating where a PDCCH of the UE is located in a control region allocated in a subframe. Therefore, the UE monitors a set of PDCCH candidates in the subframe to find a PDCCH of the UE. Monitoring implies that the UE attempts decoding of each PDCCH according to all the monitored DCI formats. This is referred to as blind decoding (or blind detection). For example, the UE detects the PDCCH of the UE when a CRC error is not detected as a result of CRC checking after a C-RNTI of the UE is de-masked to the PDCCH candidates.

In a control channel described up to now, one PDCCH is valid within only one subframe in which the PDCCH is transmitted. Therefore, in order for the UE to receive the PDCCH transmitted to the UE, the UE has to perform blind decoding on all CCEs existing in a control region in every subframe. Since the UE does not know which PDCCH format is transmitted, the UE has to decode all PDCCHs with a possible PDCCH format until blind decoding of the PDCCH is successfully performed in every subframe. The UE does not know how many CCEs are used by the PDCCH for the UE, and thus the UE has to attempt detection with all possible CCE aggregation levels until blind decoding of the PDCCH is successfully performed.

However, even when the UE continuously receives data, it is very ineffective for the BS to transmit the PDCCH in every subframe and for the UE to perform blind decoding on the PDCCH in every subframe. This is because limited radio resources are wasted and power consumption of the UE is unnecessarily increased. In addition, limited PDCCH resource may result in potential scheduling restriction since PHICH and PCFICH share the REG resources in PDCCH region so that possible number of PDCCH transmission in each subframes is different. Therefore, the PDCCH needs to be appropriately distributed to another subframe having low PDCCH overhead.

Therefore, resources need to be allocated using one PDCCH for several subframes, and/or a PDCCH is transmitted in a subframe in which PDCCH overhead is lower, and/or available PDCCH resource is larger in order to avoid potential PDSCH scheduling restriction. That is, one PDCCH can be valid within the several subframes or in a different subframe. Hereinafter, a multi-subframe allocation method in which resources are allocated using one PDCCH for several subframes, and/or a resource is allocated using a PDCCH in another subframe, and a data receiving method in which a UE uses the PDCCH will be described. For convenience of explanation, the aforementioned frame structure in which a PDCCH is valid only in the subframe in which the PDCCH is transmitted is referred to as a long term evolution (LTE) frame structure, and a UE using the LTE frame structure is referred to as an LTE_UE. In addition, a frame structure in which one PDCCH may allocate data for several subframes or different subframe is referred to as an LTE-A frame structure, and a UE using the LTE-A frame structure is referred to as an LTE_A_UE. Preferably, the LTE_UE and the LTE_A_UE maintain compatibility with each other. Thus, in a method described below, a BS can transmit a PDCCH simultaneously to the LTE_UE and the LTE_A_UE.

Figure 13:
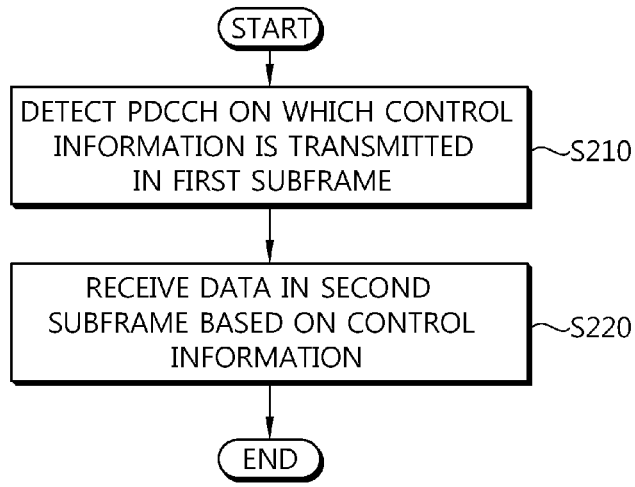
FIG. 13 is a flowchart showing a method of receiving data according to an embodiment of the present invention.

FIG. 13 is a flowchart showing a method of receiving data according to an embodiment of the present invention.

Referring to FIG. 13, a UE detects a PDCCH on which control information is transmitted in a first subframe (step S210). The UE receives data in at least one second subframe based on the control information (step S220).

Hereinafter, for convenience of explanation, a subframe in which the PDCCH is transmitted is referred to as the 1st subframe, and subframe(s) in which the PDCCH transmitted in the 1st subframe is valid is (are) referred as the 2nd subframe(s). The 2nd subframe(s) include the 1st subframe and/or one or more subframes subsequent to the 1st subframe. In addition, the 2nd subframes may be either contiguous or discontiguous if multiple subframes are used for resource allocation as 2nd subframes.

The control information may further include subframe information which indicates the 2nd subframe(s) in addition to scheduling information for data reception. The subframe information may include the number of the 2nd subframe(s).

In addition, the subframe information may include an offset field. The offset field may indicate an offset between the first subframe and a third subframe, the third subframe which is one subframe out of the 2nd subframe(s). Alternatively, the offset field may indicate an offset between two adjacent subframes out of the 2nd subframes. The subframe information may include a plurality of offset fields. For example, it is assumed that the 1st subframe is a subframe n, and the 2nd subframes are a subframe n+2 and a subframe n+5. In this case, the subframe information may include two offset fields. The each of the two offset fields may indicate an offset between each of the 2nd subframes and the 1st subframe, for example, (2, 5). Alternatively, the two offset fields may indicate an offset between the 1st subframe and one of the 2nd subframes and an offset between the 2nd subframes in accordance with a subframe order, for example, (2, 3).

The subframe information may include one offset field. For example, if the 1st subframe is the subframe n and an offset is 3, the 2nd subframe(s) may be regularly located, for example, subframes n+3 and n+6.

Hereinafter, an LTE-A frame structure will be described in detail.

(1) Fixed Multi-Subframe Allocation Structure

The LTE-A frame structure has to be designed such that not only an operation of an LTE_A_UE but also an operation of an LTE_UE are not affected by the structure.

Figure 14:
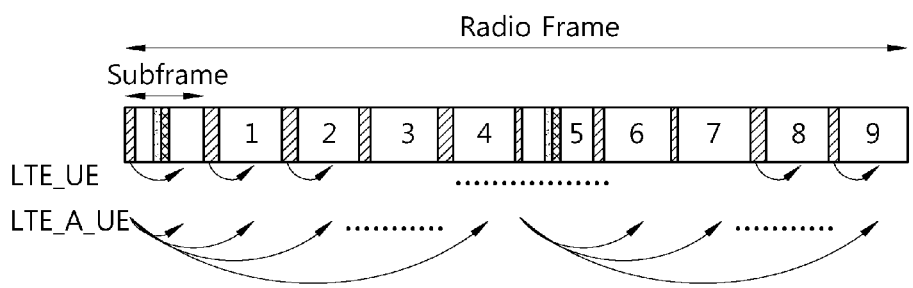
FIG. 14 shows an example of a method of allocating data through PDCCHs of a long term evolution (LTE) user equipment and a long term evolution-advance (LTE-A) user equipment.

FIG. 14 shows an example of a method of allocating data through PDCCHs of an LTE_UE and an LTE_A_UE.

Referring to FIG. 14, in the LTE_UE, a PDCCH is valid only in the same subframe in which the PDCCH is transmitted. In the LTE_A_UE, one PDCCH may have only control information of the same subframe similarly to the LTE_UE, or may have control information of another subframe or several subframes. The LTE_A_UE also can use the same DCI format as the LTE_UE. One PDCCH may always be valid during a fixed number of subframes. Alternatively, the number of valid subframes for one PDCCH may differ according to a time. In this case, the LTE_A_UE can receive subframe information including the number of subframes during which one PDCCH is valid from the BS. For example, the subframe information may include the number of 2nd subframes. The subframe information may include information indicating the number of radio frames during which one PDCCH is valid. The subframe information may be identical for all LTE_A_UEs in a cell or may differ from one LTE_A_UE to another. The subframe information may be transmitted using a higher layer signaling according to a LTE_A_UE, may be used semi-statically according to a cell, or may be transmitted using a broadcast message. One PDCCH for LTE_A_UE may be valid only for a corresponding subframe within a multi-subframe duration. In this case, a specific time offset indicating valid subframe of the PDCCH can be informed by BS.

According to the DCI formats, PDCCH for LTE_A_UE can be different such that some PDCCH are only valid in the same subframe as similar to that of LTE_UE and the other PDCCH are valid during multi-subframe duration. Among the PDCCH valid during muti-subframe duration, at least one PDCCH is used for multiple resource allocation and the other PDCCH are used for a resource allocation in different subframe.

The LTE_A_UE can continuously receive data by using one PDCCH during a multi-subframe duration corresponding to the subframe information. Since the UE does not have to find a PDCCH of the UE by performing blind decoding in every subframe, unnecessary power consumption can be reduced. In addition, since the BS does not continuously transmit the PDCCH in every subframe, a corresponding resource can be used for another PDCCH transmission and/or data transmission. Accordingly, an overall system throughput can be improved and PDSCH scheduling restriction can be relaxed.

(2) Multi-Subframe Allocation Method Using Multi-Subframe Indicator (MSI)

When the number of valid subframes for one PDCCH differs according to a time, an MSI may be added to information filed of a DCI format. The MSI is subframe information indicating the number of subframes during which the PDCCH is valid. By adding the MSI to the DCI format, the subframe information may vary according to a time, an LTE_A_UE, or a BS.

The MSI may be added to all DCI formats or may be added only a DCI format related to the PDSCH. Alternatively, among the DCI formats related to all PDSCHs, the MSI may be used for a DCI format capable of transmitting a large amount of data or for a DCI format supporting rank-adaptive spatial multiplexing such as the DCI format 2. Alternatively, a DCI format may be configured for the LTE_A_UE and the MSI may be added only to the DCI format.

Adding of a new information field to a DCI format results in a slight increase of an overhead, but enables flexible resource allocation. Therefore, control can be achieved for each subframe, and a system throughput can be improved.

In the aforementioned multi-subframe allocation method, one PDCCH is valid during consecutive multiple subframes. In a multi-subframe allocation method to be described below, one PDCCH is valid during discontinuous multiple subframes.

(3) Multi-Subframe Allocation Method Using Offset

One PDCCH may be valid in the subframe(s) having the corresponding offset. If one PDCCH is only valid in a subframe, the PDCCH is used for resource allocation in the subframe having the corresponding offset. Alternatively, one PDCCH is valid in multiple subframes comprising a subframe which the PDCCH is transmitted and a sub-sequence subframe corresponding to an offset of the subframe. As such, discontinuous multiple subframes can be allocated by using the offset.

The offset may be predefined. Alternatively, the offset may be informed by a BS. For example, information regarding offset may be signaled in higher layer signaling or may be signaled in a PDCCH. In this case, an LTE_A_UE may receive subframe information indicating an offset between a 1st subframe and a 2nd subframe from a BS. The subframe information indicating the offset may be transmitted by additionally defining an offset field in a specific DCI format. When the multiple subframes are allocated by using the offset, it is possible to mitigate PDCCH resource leakage in a subframe by distributing PDCCH to another subframe having less PDCCH overhead.

Figure 15:
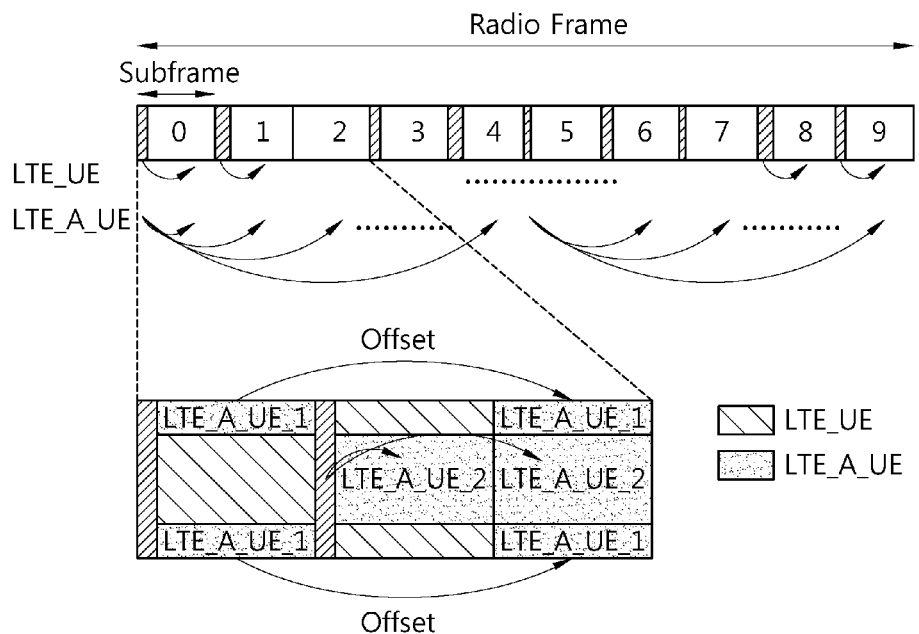
FIG. 15 shows an example of a multi-subframe allocation method using an offset.

FIG. 15 shows an example of a multi-subframe allocation method using an offset.

Referring to FIG. 15, a subframe 0 and a subframe 1 each include a control region, but a subframe 2 does not include a control region. Hereinafter, for convenience of explanation, a control region included in the subframe 0 is referred to as a control region 0, and a control region included in the subframe 1 is referred to a control region 1. In the control region 0, a PDCCH of an LTE_UE and a PDCCH of a 1st LTE_A_UE (hereinafter, LTE_A_UE_1) are transmitted. The PDCCH transmitted on the control region 0 for the LTE_A_UE_1 may include an offset field indicating the subframe 2. Therefore, the PDCCH transmitted on the control region 0 for the LTE_A_UE_1 is valid in the subframe 0 and the subframe 2.

In the control region 1, the PDCCH of the LTE_UE and a PDCCH of a 2nd LTE_A_UE (hereinafter, LTE_A_UE_2) are transmitted. The PDCCH transmitted on the control region 1 for the LTE_A_UE_2 is valid in the subframe 1 and the subframe 2. Since there is no control region in the subframe 2, resources cannot be allocated to the LTE_UE in the subframe 2. Resources used by the LTE_UE in the subframe 1 can be reallocated to the LTE_A_UE_1.

The multi-subframe allocation method using the offset can have a configuration in which no PDCCH is transmitted such as in the subframe 2 of FIG. 15. Since unnecessary transmission of the PDCCH can be further reduced, limited resources can be effectively used.

In addition to an offset for a subframe, an offset in a frequency domain and/or an offset in a time domain can be used. The offset information may indicate either an offset in a time domain or an offset in a frequency domain. For example, if the offset in the frequency domain is N, resources shifted by N resource blocks can be allocated to the LTE_A_UE in a next subframe. If the offset in the time domain is M, resources shifted by M OFDM symbols can be allocated to the LTE_A_UE in a next subframe.

(4) Multi-Subframe Allocation Method Using MSI and Offset

The aforementioned multi-subframe allocation method using the MSI and the aforementioned multi-subframe allocation method using the offset can be used in combination with each other. A DCI format transmitted through a PDCCH may include an MSI field and an offset field. When using the combination of the MSI and the offset, the PDCCH is valid from a subsequent subframe spaced by an offset to a subframe corresponding to the MSI. In this case, an overhead is significantly increased since both the MSI field and the offset field have to be defined in the DCI format, but a scheduler of a BS can have maximum flexibility. Alternatively, without having to use the MSI field, multiple subframes can be transmitted for each LTE_A_UE or each cell by using upper layer signaling.

(5) Multi-Subframe Allocation Method Using Reserved State of PCFICH

Referring to table 1, a CFI of 4 is reserved for a further use. Reserving one state of a highly reliable channel such as the PCFICH is ineffective when it is considered that the PCFICH is transmitted in every subframe. Therefore, multiple subframes can be allocated by utilizing this reserved state. When the CFI is 4, an LTE_UE detects error occurrence and thus does not perform blind decoding of a PDCCH in a corresponding subframe. Therefore, when the CFI of 4 is used for another usage for an LTE_A_UE, it has no effect on the LTE_UE. The CFI of 4 can be used for the LTE_A_UE in several meanings. For example, if a CFI of a specific subframe is 4, it may imply that a PDCCH of a previous subframe is valid. If the CFI is 4 continuously, it may imply that the PDCCH of the previous subframe is continuously valid. The LTE_A_UE may receive data by directly using the PDCCH of the previous subframe in the specific subframe. For another example, if the CFI of the specific subframe is 4, it may imply that the PDCCH does not exist in the specific subframe. As such, if a CFI of each of the 2nd subframes except for the 1st subframe has a specific value, a UE may determine that a PDCCH of the 1st subframe is valid in the each of the 2nd subframes.

However, among DCI formats transmitted through a PDCCH, a DCI format (e.g., a DCI format 0) is related to a PUSCH independent from a PDSCH. Therefore, if the CFI of the specific subframe is 4, it may imply that the LTE_A_UE has a PDCCH for a PUSCH only in one OFDM symbol. As such, the CFI of 4 can be used for the LTE_A_UE related to the PDCCH of a corresponding subframe.

(6) Multi-Subframe Allocation Method by Reusing Information Field of DCI Format

The number of valid subframes for one PDCCH can be indicated by reusing an information filed of a DCI format. For example, the number of valid subframes can be indicated by reusing an MCS field included in most of DCI formats. Even if the same number of resource blocks are allocated, a size of information that can be transmitted differs according to an MCS level. Therefore, allocation of a specific number of multiple subframes can be defined according to the MCS level. In this case, a specific payload size can be transmitted irrespective of the MCS level. Further, since an additional MSI field does not have to be added to the DCI format, an overhead of the PDCCH can be reduced. In addition thereto, the multiple subframes can be allocated by using another information filed other than the MCS field or by combining a plurality of information fields of the DCI format.

(7) Channel Coding and HARQ Process in Multi-Subframe Allocation

When using an LTE_UE, channel coding is performed according to data in one subframe, and a CRC is used for error detection. Therefore, when using the LTE_UE, HARQ operates for each subframe. When multiple subframes are allocated using one PDCCH to an LTE_A_UE, channel coding can be used throughout several subframes. Accordingly, an overhead caused by the CRC can be reduced. When using the LTE_A_UE, a method of performing an HARQ process has a problem. Therefore, it is preferable that a type of HARQ used in the LTE_A_UE is different from that used in the LTE_UE. For example, when multiple subframes are allocated, HARQ can be performed in accordance with an HARQ process number of a last subframe of the multiple subframes.

(8) PDCCH Structure for Applying HARQ Process for Each Subframe

When a downlink multi-subframe is allocated to an LTE_A_UE by using one PDCCH, DCI transmitted on the PDCCH can allocate several HARQ processes through an information field.

The following table shows an example of information fields constituting a DCI format that allocates several HARQ processes.

TABLE 5

| Information fields | # of bits | Information |
|---|---|---|
| Resource allocation header | 1 bit | Resource allocation type 0/type 1 |
| Resource block assignment | variable | # of bits can be different according to the bandwidth size |
| MCS | 5 bits | Modulation order and channel coding rate |
| 1st HARQ process number | 3 bits | HARQ process number for 1st subframe in the PDCCH coverage |
| 2nd HARQ process number | 3 bits | HARQ process number for 2nd subframe in the PDCCH coverage |
| New data indicator (NDI) | 1 bit | If toggled, indicates new data transmission |
| Redundancy version (RV) | 2 bits | Starting point of the channel codes for HARQ |
| TPC command for PUCCH | 2 bits | For uplink power control |
| Downlink Assignment Index | 2 bits | TDD only |

Referring to the table above, when up to two subframes can be allocated to an UE by using one PDCCH, an HARQ process can be applied for each subframe by allocating two independent HARQ processes.

The following table shows another example of information fields constituting a DCI format that allocates several HARQ processes.

TABLE 6

| Information fields | # of bits | Information |
|---|---|---|
| Resource allocation header | 1 bit | Resource allocation type 0/type 1 |
| Resource block assignment | variable | # of bits can be different according to the bandwidth size |
| MCS | 5 bits | Modulation order and channel coding rate |
| 1st HARQ process number | 3 bits | HARQ process number for 1st subframe in the PDCCH coverage |
| 2nd HARQ process number | 3 bits | HARQ process number for 2nd subframe in the PDCCH coverage |
| 1st NDI | 1 bit | If toggled, indicates new data transmission for 1st subframe |
| 2nd NDI | 1 bit | If toggled, indicates new data transmission for 2nd subframe |

TABLE 6-continued

| Information fields | # of bits | Information |
| --- | --- | --- |
| 1st RV | 2 bits | Starting point of the channel codes for HARQ for 1st subframe |
| 2nd RV | 2 bits | Starting point of the channel codes for HARQ for 2nd subframe |
| TPC command for PUCCH | 2 bits | For uplink power control |
| Downlink Assignment Index | 2 bits | TDD only |

Referring to the table above, not only an HARQ process number field but also a new data indicator (NDI) field and a redundancy version (RV) field can be defined for each subframe. The RV field may be shared by a plurality of subframes.

The above description focuses on a case where a UE receives downlink data in a plurality of downlink subframes based on control information through one PDCCH. However, the above description can also apply to a case where the UE transmits uplink data in a plurality of uplink subframes based on control information through one PDCCH.

Figure 16:
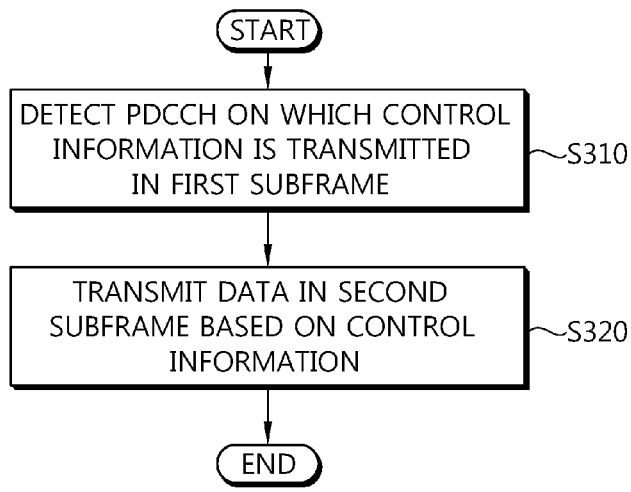
FIG. 16 is a flowchart showing a method of transmitting data according to an embodiment of the present invention.

FIG. 16 is a flowchart showing a method of transmitting data according to an embodiment of the present invention.

Referring to FIG. 16, a UE detects a PDCCH on which control information is transmitted in a 1st subframe (step S310). The UE transmits data in at least one second subframe based on the control information (step S320).

Figure 17:
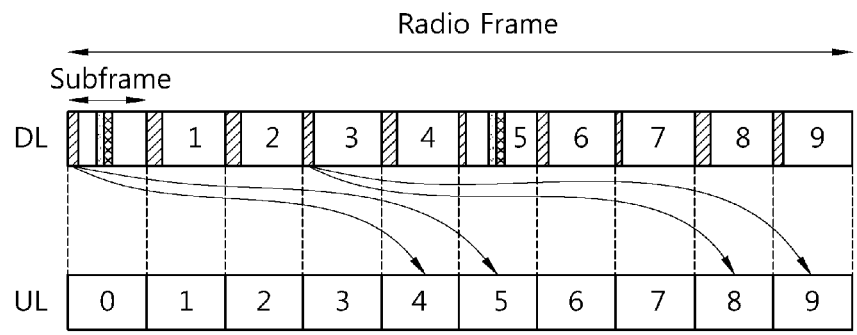
FIG. 17 shows an example of a method of transmitting data based on PDCCHs of a LTE-A user equipment.

FIG. 17 shows an example of a method of transmitting data based on PDCCHs of a LTE-A user equipment.

Referring to FIG. 17, a LTE_A_UE receives a first uplink grant on PDCCH in downlink subframe 0. The LTE_A_UE transmits uplink data based on the first uplink grant in uplink subframe 4 and uplink subframe 5 each. The LTE_A_UE receives a second uplink grant on PDCCH in downlink subframe 3. The LTE_A_UE transmits uplink data based on the second uplink grant in uplink subframe 4 and uplink subframe 5 each. In contrast, if a LTE_UE receives a uplink grant on PDCCH in downlink subframe 0, the LTE_UE can transmit uplink data based on the uplink grant in only uplink subframe 4.

As such, the UE can effectively receive data during a plurality of subframes by using one PDCCH. Therefore, since the UE does not have to find a PDCCH of the UE by performing blind decoding in every subframe, unnecessary power consumption can be reduced. In addition, since the BS does not continuously transmit the PDCCH in every subframe, a corresponding resource can be used for data transmission. Accordingly, an overall system throughput can be improved.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

The invention claimed is:

1. A method of receiving, by a user equipment (UE), data in a wireless communication system, the method comprising:
   detecting a physical downlink control channel (PDCCH) on which control information is transmitted in a first subframe; and
   receiving data in a plurality of second subframes in which the PDCCH detected in the first subframe is valid, wherein the receiving of the data is based on the control information,
   wherein the control information comprises subframe information which indicates a number of the plurality of second subframes that is valid for receiving the data during which the PDCCH detected in the first subframe is valid,
   wherein a control format indicator (CFI) transmitted on a physical control format indicator channel (PCFICH) in the plurality of second subframes comprises a 32 bit codeword that has a specific value,
   wherein the specific value is used to determine whether the PDCCH of the first subframe is valid in each of the plurality of second subframes,
   wherein the subframe information further comprises two offset fields indicating a first offset and a second offset,
   wherein the first offset indicates an offset in a time domain between the first subframe and a non-adjacent subframe out of the plurality of second subframes, and
   wherein the second offset indicates an offset in the time domain between two adjacent subframes out of the plurality of second subframes, wherein neither of the two adjacent subframes is the first subframe.

2. The method of claim 1, wherein the plurality of second subframes are contiguous.

3. The method of claim 1, wherein the first subframe and the plurality of second subframes are transmitted in different time.

4. A user equipment comprising:
   a radio frequency (RF) unit transmitting or receiving a radio signal; and
   a processor coupled with the RF unit and configured to:
   detect a physical downlink control channel (PDCCH) on which control information is transmitted in a first subframe; and
   receive data in a plurality of second subframes in which the PDCCH detected in the first subframe is valid, wherein the data is received based on the control information,
   wherein the control information comprises subframe information which indicates a number of the plurality of second subframes that is valid for receiving the data during which the PDCCH detected in the first subframe is valid,
   wherein a control format indicator (CFI) transmitted on a physical control format indicator channel (PCFICH) in the plurality of second subframes comprises a 32 bit codeword that has a specific value,
   wherein the specific value is used to determine whether the PDCCH of the first subframe is valid in each of the plurality of second subframes, wherein the subframe information further comprises two offset fields indicating a first offset and a second offset,
wherein the first offset indicates an offset in a time domain between the first subframe and a non-adjacent subframe out of the plurality of second subframes, and
wherein the second offset indicates an offset in the time domain between two adjacent subframes out of the plurality of second subframes, wherein neither of the two adjacent subframes is the first subframe.

5. A method of transmitting, by a user equipment (UE), data in a wireless communication system, the method comprising:
   detecting a physical downlink control channel (PDCCH) on which control information is transmitted in a first subframe; and
   transmitting data in a plurality of second subframes in which the PDCCH detected in the first subframe is valid, wherein the transmitting of the data is based on the control information,
   wherein the control information comprises subframe information which indicates a number of the plurality of second subframes that is valid for receiving the data during which the PDCCH detected in the first subframe is valid, and
   wherein a control format indicator (CFI) transmitted on a physical control format indicator channel (PCFICH) in the plurality of second subframes comprises a 32 bit codeword that has a specific value,
   wherein the specific value is used to determine whether the PDCCH of the first subframe is valid in each of the plurality of second subframes,
   wherein the subframe information further comprises two offset fields indicating a first offset and a second offset,
   wherein the first offset indicates an offset in a time domain between the first subframe and a non-adjacent subframe out of the plurality of second subframes, and
   wherein the second offset indicates an offset in the time domain between two adjacent subframes out of the plurality of second subframes, wherein neither of the two adjacent subframes is the first subframe.

* * * * *